US005831649A

United States Patent [19]

Watrobski et al.

[11] Patent Number: 5,831,649

[45] Date of Patent: *Nov. 3, 1998

[54] THERMAL INK JET PRINTING SYSTEM INCLUDING PRINTHEAD WITH ELECTRONICALLY ENCODED IDENTIFICATION

[75] Inventors: Thomas E. Watrobski, Penfield; Juan J. Becerra, Webster, both of N.Y.

[73] Assignee: Xerox Corporation, Stamford, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 650,149

[22] Filed: May 17, 1996

[51] Int. Cl.$^{6}$ .................... G01D 15/16

[52] U.S. Cl. .................... 3117/19; 347/19

[58] Field of Search .................... 347/5, 19, 49, 347/50, 14, 162, 168; 400/74, 75; 395/108, 116

[56] References Cited

U.S. PATENT DOCUMENTS

| | | | |
|---|---|---|---|
| Re. 32,572 | 1/1988 | Hawkins et al. | 156/626 |
| 4,571,599 | 2/1986 | Rezanka . | |
| 4,774,530 | 9/1988 | Hawkins . | |
| 4,872,027 | 10/1989 | Buskirk et al. . | |
| 5,049,898 | 9/1991 | Arthur et al. | 346/1.1 |
| 5,363,134 | 11/1994 | Barbehenn et al. | 347/49 |
| 5,504,507 | 4/1996 | Watrobski et al. | 347/19 |

FOREIGN PATENT DOCUMENTS

| | | |
|---|---|---|
| 340514A | 8/1985 | Germany . |

*Primary Examiner*—N. Le
*Assistant Examiner*—Anh T. N. Vo

[57] ABSTRACT

An ink jet printing system includes an ink jet printhead which has an n-bit code representing a unique characteristic of the printhead formed on a substrate forming a part of the printhead. An n-bit data code is sent from a remote source to the printhead. If the data code matches the code on the printhead, printing operation is initiated. If the code is not matched, the print operation is inhibited.

7 Claims, 6 Drawing Sheets

THERMAL INK JET PRINTING SYSTEM INCLUDING PRINTHEAD WITH ELECTRONICALLY ENCODED IDENTIFICATION

BACKGROUND OF THE INVENTION AND MATERIAL DISCLOSURE STATEMENT

The present invention relates to an ink jet printer and, more particularly, to a system and method for controlling print operation by sensing a unique digital code provided on a portion of a printhead.

Ink jet printers eject ink onto a print medium such as paper in controlled patterns of closely spaced dots. To form color images, multiple ink jet printheads can be used, with each head being supplied with ink of a different color from an associated ink container. Alternatively, a single printhead may be divided into segments such that each color may occupy a portion of the array. Thermal ink jet printing systems use thermal energy selectively produced by resistors located in ink filled channels or chambers near channel terminating nozzles. Firing signals are applied to the resistors through associated drive circuitry to vaporize momentarily the ink and form bubbles on demand. Each temporary bubble expels an ink droplet and propels it toward a recording medium. The printing system may be incorporated in a carriage type printer, such as the type disclosed, for example, in U.S. Pat. No. 4,571,599 and Re. Pat. No. 32,572. The contents of these patents are hereby incorporated by reference. The printhead is usually sealingly attached to an ink supply container and the combined printhead and container form a printhead cartridge assembly which is reciprocated to print one swath of information at a time on a stationarily held recording medium, such as paper. After the swath is printed, the paper is stepped a distance equal to the height of the printed swath, so that the next printed swath will be contiguous therewith. The procedure is repeated until the entire page is printed.

In commercially available ink jet printers such as, for example, a Xerox 4004, an essential portion of the printhead, particularly the portion of the printhead having the heating element formed thereon, is in the form of a silicon substrate. This silicon substrate is referred to as a heater or resistor plate but is generally known as the heater "chip" of the printhead. This heater chip typically includes not only the heating elements (resistors) formed thereon, but the series of electrical leads connecting each of the resistors to other microelectronic circuitry or components. The leads are typically in the form of a pattern of aluminum depositions, and a typical construction of the resistors is in the form of a deposition of polycrystalline silicon which forms an element having a predetermined resistance.

In a common method of manufacture of thermal ink-jet printhead modules or "chips", each chip is sized to accommodate 128 nozzles spaced at a density of 300 nozzles per inch; in terms of a chip,128 resistors are provided, each resistor having at least one lead connected thereto, as well as any other electronic circuitry which may be formed on the chip. In mass production of such chips, as many as 200 or more chips may be formed in a single silicon "wafer", the entire wafer being manufactured contiguously in a series of processes and then subsequently cut, or "diced", into the chips themselves.

An important practical concern for applications of commercial thermal ink jet printers is to ensure that a particular printhead cartridge assembly that is to be used is the proper cartridge for the function desired; i.e., if the printer is set to print in a first (magenta) color; that a magenta, rather than say black cartridge assembly, is installed. Further confirmation is needed that the particular cartridge assembly, even though having the "correct" ink is also the proper cartridge configuration for this specific system. For example, many commercial ink jet printers have follow on systems which may result in changes in the type of cartridge accepted.

According to the present invention, a printhead heater chip is provided with a digital code which provides a unique identifiable code for that particular class and make of printhead cartridge. It is known in the art to form on a thermal ink jet printhead chip encoded information. Co-pending application U.S. Ser. No. 08/957,835 assigned to the same assignee as the present invention, has an electrically readable resistance pattern formed on the chip. The pattern is symbolic of a particular performance data for that chip. The data is read out and used to control the drive signals to the individual resistors to maintain an optimum spot size of ejected drops.

U.S. Pat. No. 4,872,027 discloses printheads with individual codes which are used to control the printhead in a printing text or graphics and to extend the printing capability of the system.

SUMMARY OF THE INVENTION

It is an object of the present invention to provide a code identification system for an ink jet printer wherein the printer electronics recognizes the presence of a properly installed and identified printhead cartridge assembly prior to a print operation.

It is a further object to provide a unique code for a particular group of printhead cartridge assemblies having common non-performance characteristics and to enable print operation only when the code is matched to an identical code sent by the printer controller logic.

More particularly, the present invention relates to a thermal ink jet printing system having an ink jet printhead cartridge assembly which includes a substrate having a plurality of heater resistors defined thereon,

- an encoding logic circuit formed on said substrate and including an n-bit digital identification code uniquely associated with a characteristic of said cartridge,
- controller means for sending an n-bit data signal to said encoding logic circuit and
- logic means for determining whether said identification code is a match for said n-bit data signal and for generating appropriate output signals representative of said match by comparing against a single code or a plurality of codes.

DESCRIPTION OF THE INVENTION

While the present invention will hereinafter be described in connection with preferred embodiments thereof, it will be understood that it is not intended to limit the invention to these embodiments. On the contrary, it is intended to cover all alternatives, modifications, and equivalents as may be included within the spirit and scope of the invention as defined by the appended claims.

Figure 1:
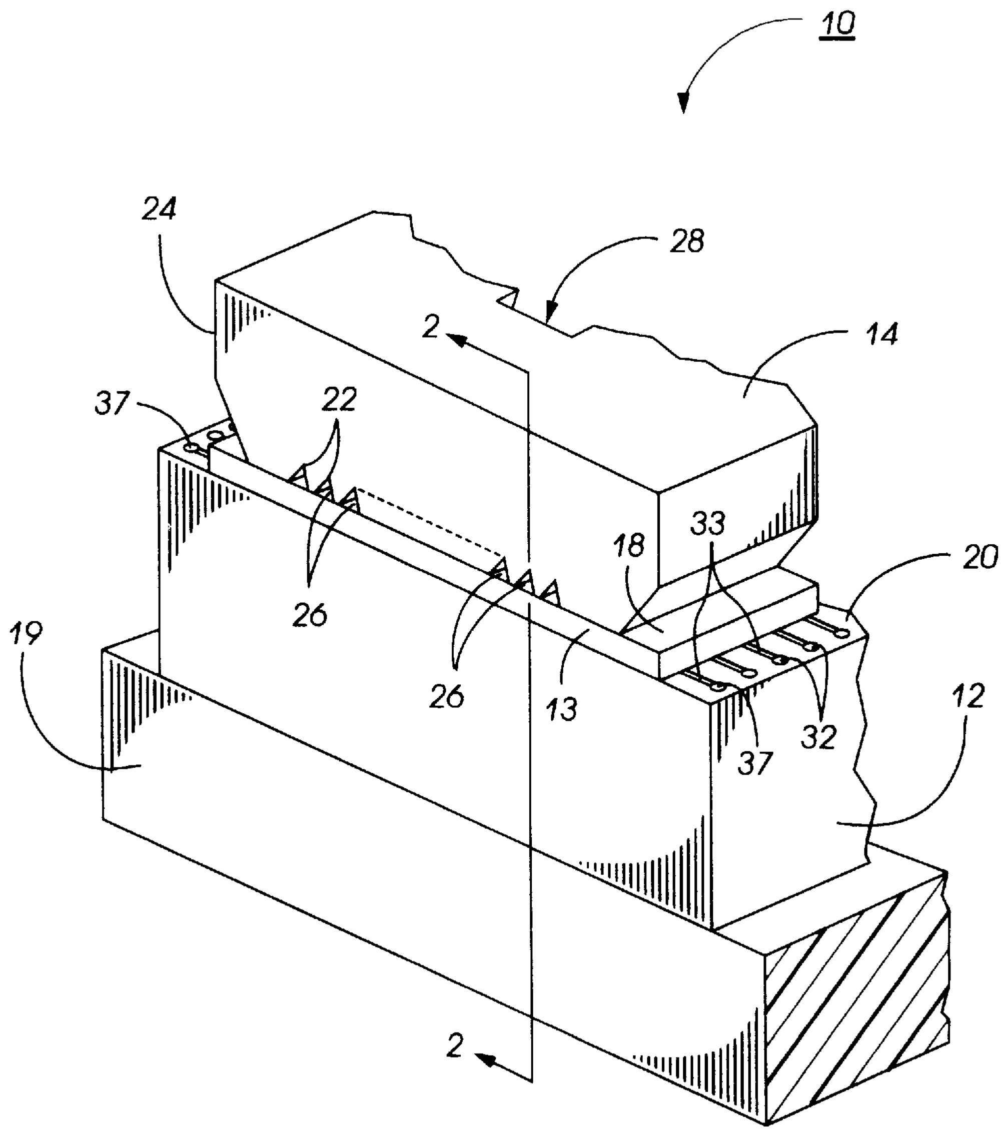
FIG. 1 PRIOR ART
FIG. 1 is an enlarged schematic isometric view of a prior art printhead mounted on a daughter board showing the front face of the printhead with the droplet-emitting nozzles.
Figure 2:
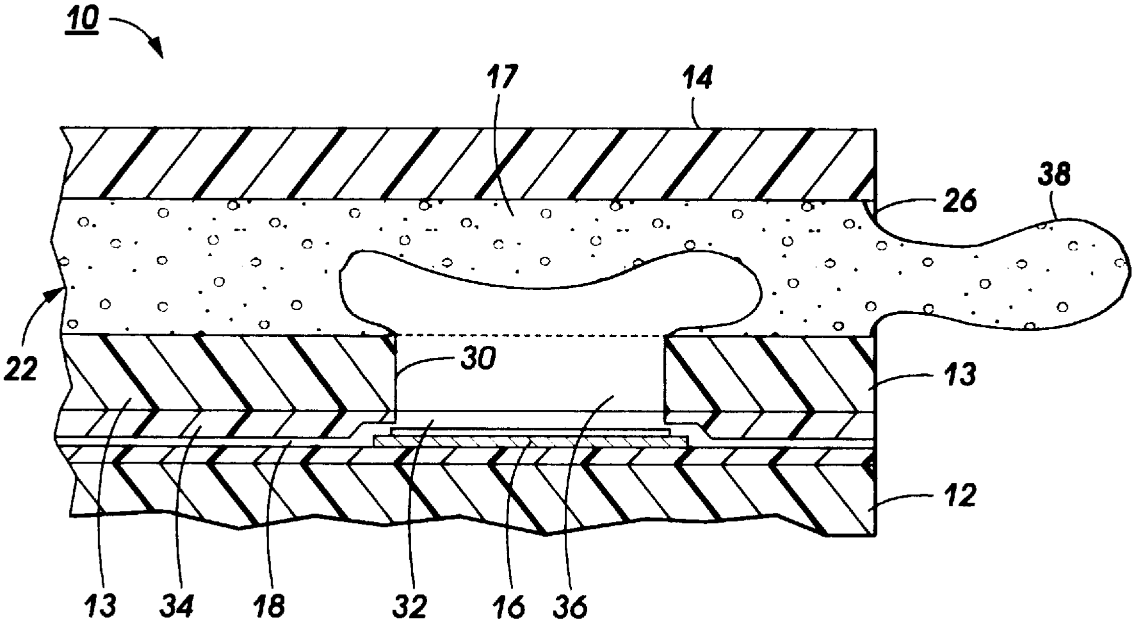
FIG. 2 PRIOR ART
FIG. 2 is a fragmentary sectional view of an ink ejecting portion of FIG. 1.

FIG. 1 is an enlarged schematic view of a prior art printhead mounted on a daughter board showing the front face of the printhead. FIG. 2 shows a cross section of a nozzle portion of the printhead demonstrating the manner in which ink in a channel is heated by a resistor to cause the ink to be expelled through the nozzle. A printhead of this type is disclosed in U.S. Ser. No. 4,774,530, whose contents are hereby incorporate by reference. The present invention, in a preferred embodiment, is directed to encoding circuitry which is used in a printing system which utilizes a printhead of this type. Referring to FIGS. 1 and 2, printhead 10 comprises a lower electrically insulating substrate, or heater element plate 12, covered by an insulating layer 13 and bonded to an upper substrate, or channel plate 14. Heater plate 12 has heating resistors 16 and addressing electrodes 18 patterned on a surface 20. Channel plate 14 has parallel grooves 22 which extend to front face 24 of the printhead and form nozzles 26 when the two plates 12 and 14 are bonded together. Ink is supplied through ink fill inlet 28 and into a manifold (not shown). The ink channels are filled by capillary action. The ink is ejected by supplying electrical signals to electrodes 18 associated with the particular resistor 16. With reference to FIG. 2, it is understood that only one of a large number of ink ejecting nozzles or jets are shown.

Typically, such ejectors are sized and arranged in linear arrays of 300 to 600 ejectors per inch. As will be used in the detailed description, heater plate 12 is a silicon member having a plurality of channels for drop ejectors defined therein. A typical chip defines 128 ejectors, spaced 300 to the inch. In designs with multiple chips, each chip may include its own ink supply manifold, or multiple chips may share a single common ink supply manifold. Each ejector, or nozzle, includes a capillary channel 22 which terminates in nozzle 26. The channel 22 regularly holds a quantity of ink 17 which is maintained within the capillary channel 22 until such time as a droplet of ink is to be ejected. Each of a plurality of capillary channels 22 are maintained with a supply of ink from an ink supply manifold (not shown). Sandwiched between thick film layer 13 and heater chip 12 are heater elements which cause the ejection of a droplet of ink from the capillary channel 22. Heating element 16 is placed within a recess pit 30 formed by an opening in the thick film layer 13. The heating element 16 is typically protected by a protective layer 32 made of, for example, a tantalum layer having a thickness of about 0.5 microns. The heating element 16 is electrically connected to an addressing electrode 18. Each of the large number of ejectors in a printhead will have its own heating element 16 and individual addressing electrode 18, to be controlled selectively by control circuitry. The addressing electrode 18 is typically protected by a passivation layer 34.

When an electrical signal is applied to the addressing electrode 18, energizing the heating element 16, the liquid ink immediately adjacent the element 16 is rapidly heated to the point of vaporization, creating a bubble 36 of vaporized ink. The force of the expanding bubble 36 causes a droplet 38 of ink to be emitted from the nozzle 26 onto the surface of a sheet. The "sheet" is the surface on which the mark is to be made by the droplet, and may be, for example, a sheet of paper or a transparency.

Figure 3:
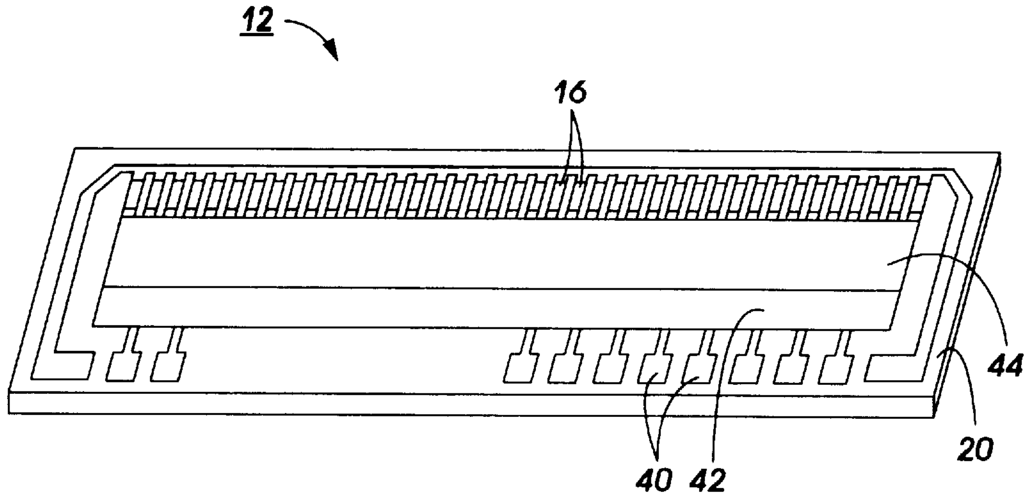
FIG. 3 PRIOR ART
FIG. 3 is a top perspective view of the heater plate reference in FIG. 1.

FIG. 3 is a top perspective view of heater chip 12 showing the heating resistors and electrical connections for applying the heating signals. Disposed on surface 20, for example, is a series of terminals 40, by which the printhead is electronically controlled by signals from the controller of a printing apparatus. Arrangements of terminals 40 for operation of the printhead are well known in the art, such as, for example, applying digital information in series or in parallel to any number of leads 40 to address a subset of the heating elements 16 on the chip 12 as needed to create a desired image. The specific circuitry for controlling heating elements 16 through terminals 40 is shown generally as logic 42, which may be of any form familiar to those skilled in the art. Logic 42, in turn, drives a set of drivers generally indicated as 44, which serve to activate, that is apply the necessary voltage, to the heaters 16 as needed. Both logic 42 and drivers 44 may be formed on the surface 52 of chip 12 using any known IC fabrication techniques.

Also disposed on the chip 50 is the set of heating elements 16, which in the complete ink-jet printhead would be disposed adjacent corresponding capillary channels 22 in abutting channel plate 14 to form the ejectors or nozzles of the ink-jet printhead. The heating elements 16 are typically made of polycrystalline silicon connected to depositions of aluminum which also forms a lead to the respective heating elements 16. The terminals 40 are made of depositions of aluminum, as is familiar in the art of IC fabrication.

According to the invention, additional circuitry is provide on surface 20 of heater plate 12 which embodies electrically readable data in digital form. The electrically readable data is an n-bit code (for the desired embodiment, an 8-bit code is used) which identifies a particular color print cartridge. In operation, the controller of a given printer would be required to enter a matching code for the installed cartridge before print operation could begin.

Figure 4:
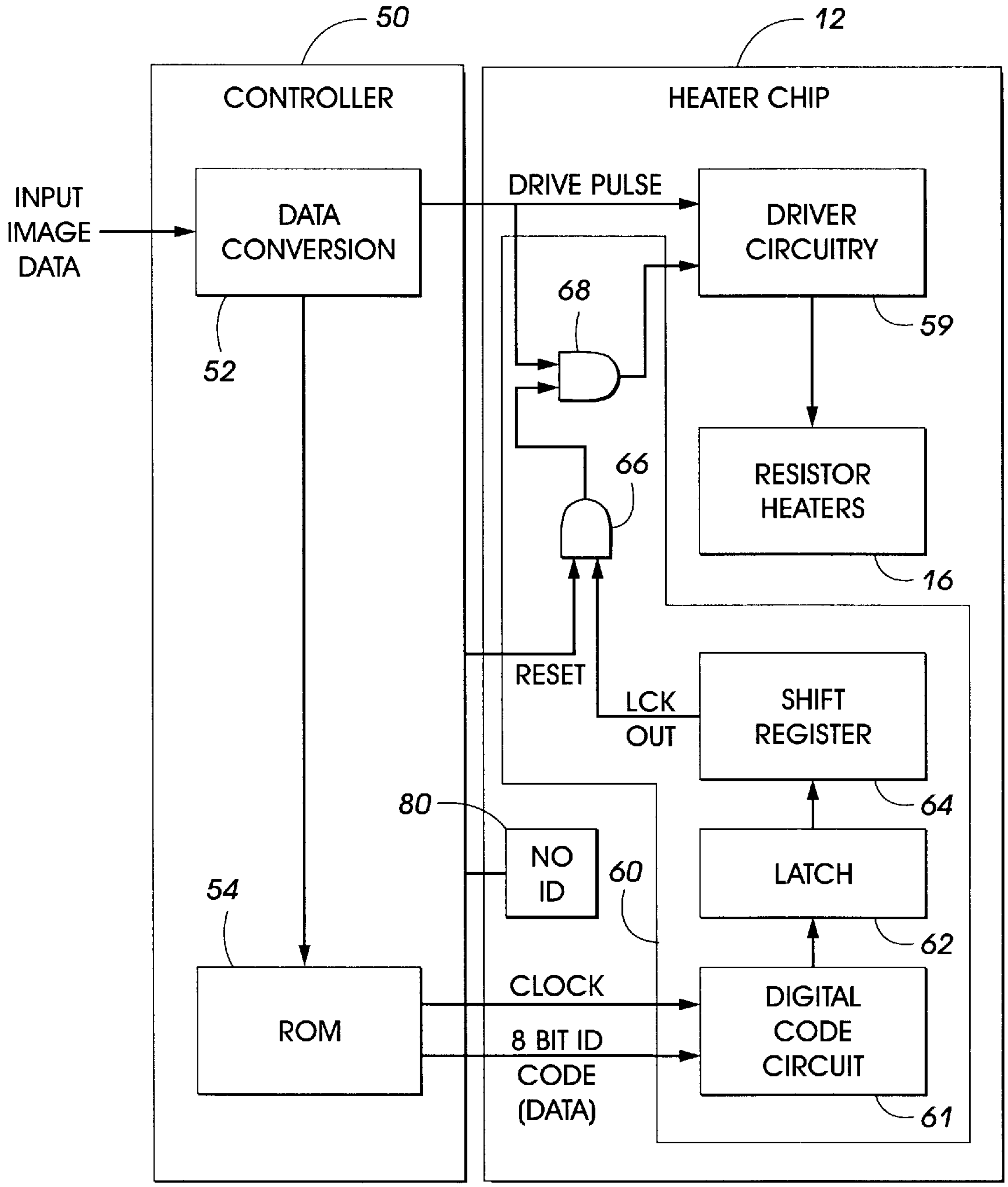
FIG. 4 is an electrical system block diagram showing the circuitry control of heater chip functions including code identification circuitry formed on the heater chip.

Referring to FIG. 4, a controller 50 receives input image data signals from an image data source such as a computer (not shown). The controller processes the print data in a data conversion circuit 52 to provide print control information to heater chip 12. Controller 50 conventionally comprises a CPU, a ROM 54 for storing programs and a RAM. The controller, besides performing the temperature sensing and correction functions described below, also controls operation of a print carriage on which printhead 10 is mounted, the movement of the recording medium as well as system timing functions.

Controller 50 sends heater resistor drive signals to driver circuitry 59 which includes terminals 40 and logic 42 and drivers 44 (FIG. 3). The drive signals are thence selectively applied to resistor heaters 16. Also formed on surface 20 of heater chip 12 is encoding circuit 60, which comprises digital code circuit 61 , latch 62, shift register 64, and AND gates 66 and 68 connected as shown. Encoding circuit 60 contains the electrically readable data which represents an 8-bit code.

Figure 5:
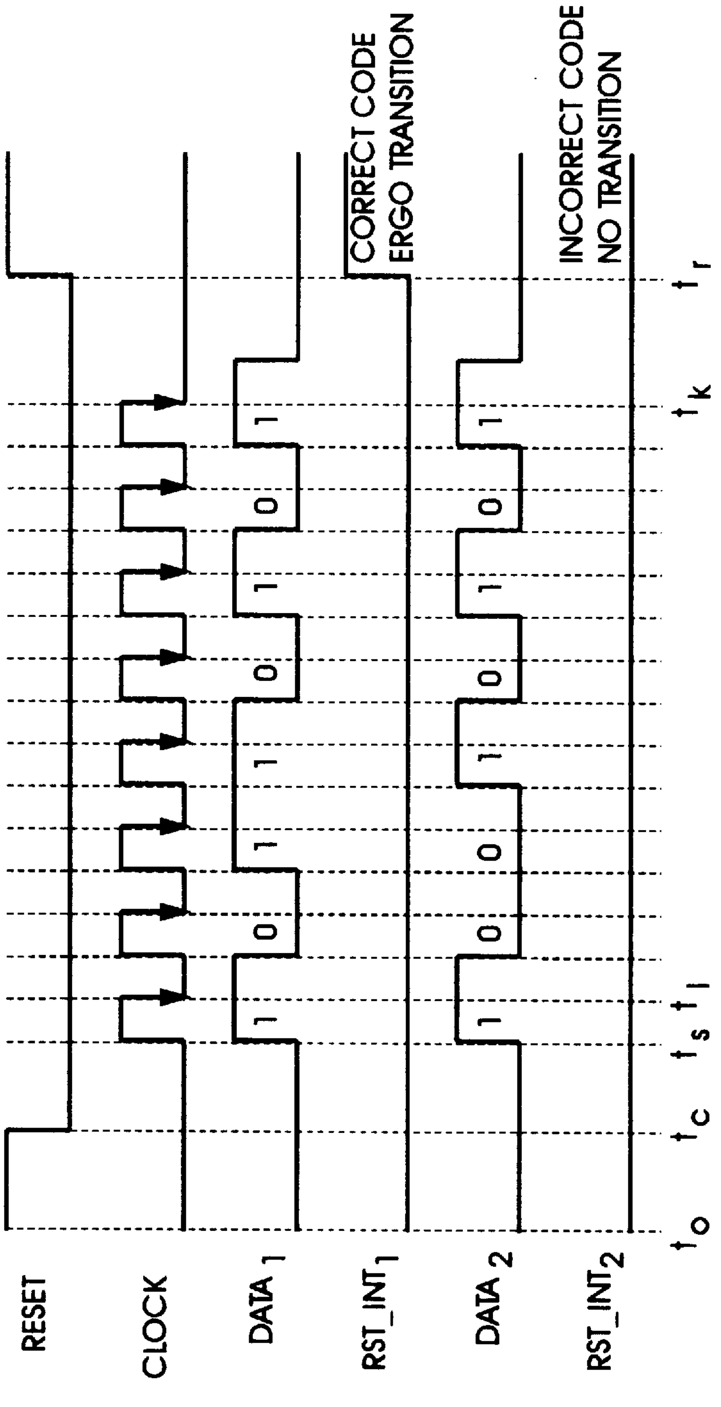
FIG. 5 is a system timing diagram.
Figure 6:
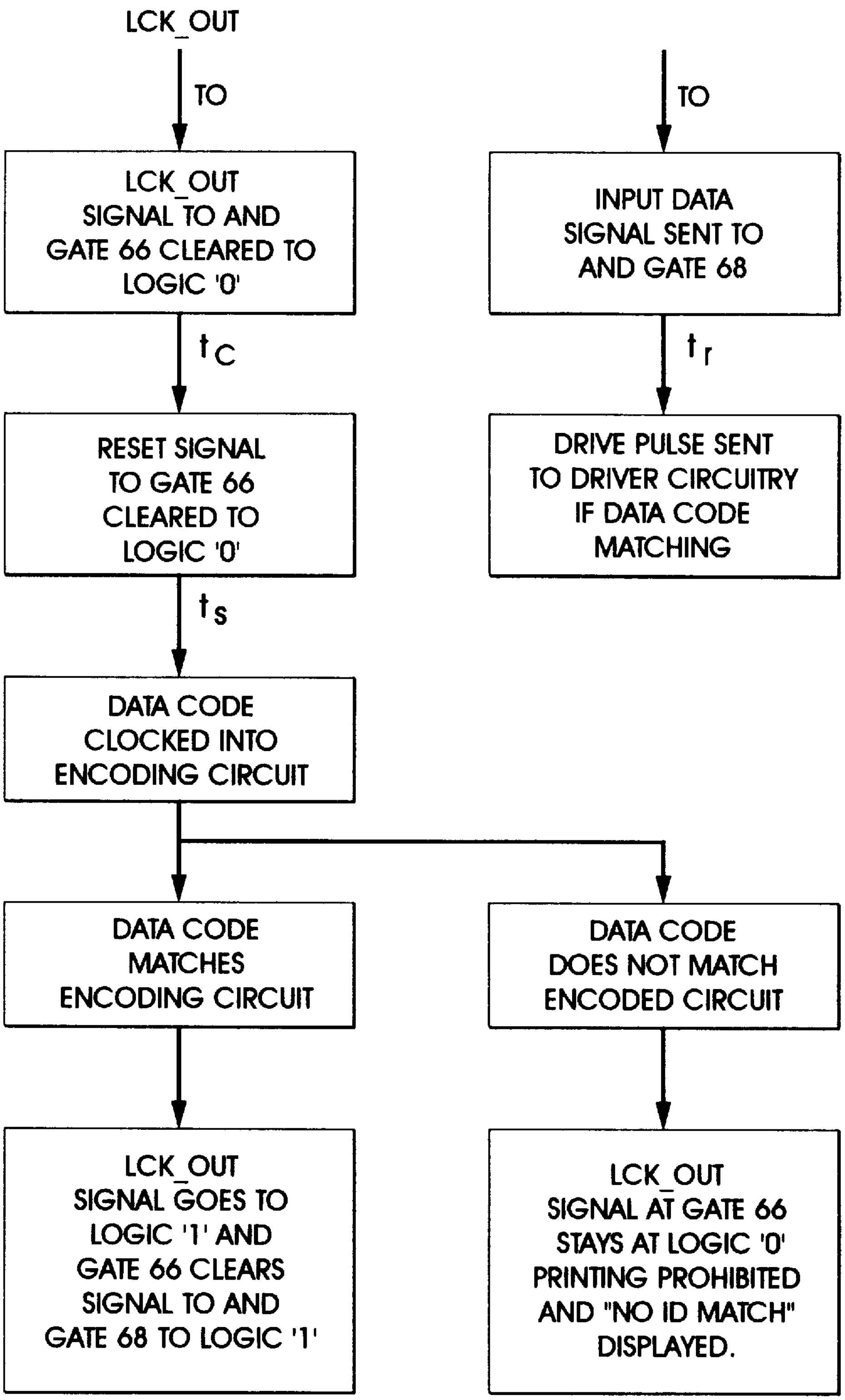
FIG. 6 is an encoding identification flow chart.

In operation and referring to system block diagram FIG. 4, timing diagram FIG. 5, and the flow chart shown in FIG. 6, it is assumed that input image data has been sent to data conversion circuit 52 in controller 50. At $t_o$ (after power-up, for example), the circuitry would be self-initialized so that the LCK_OUT signal is cleared to logic '0'. Subsequently, a reset signal from controller 50 is cleared to logic 0 at time $t_c$. At this point, the encoding circuit 60 is ready to receive a combination code which has been stored in ROM 54. The 8-bit ID code ($DATA_1$) is presented to circuit 61 at the rising edge of the CLOCK signal ($t_s$) and latched into shift register 64 by latch circuit 62 on the corresponding falling edge of the same clock signal ($t_l$). After a finite delay following the final latching action ($t_k$), the LCK_OUT signal output from shift register 64 will transition to a logic '1' if the correct 8-bit code has been entered; i.e., if the $DATA_1$ matches the digital code entered into the circuit. For this example, it is assumed that the $DATA_1$ code matches the digital code set into circuit 61. When the RESET signal from controller 50 is set to a logic '1' at $t_r$, the AND gate 66 is enabled and generates a logic '1' input to AND gate 68. The second input to gate 68 is the logic '1' drive print signal. AND gate 68 is enabled allowing print signals to be applied to the heater drive circuitry 59.

Referring still to FIGS. 4, 5 and 6, if the ID code from the controller is a $DATA_2$ signal, no match is found with the code in circuit 61 and the $LCK_{13}$ OUT signal remains low preventing print operation from beginning. At this point, the controller generates a "no ID match" signal and alerts an operator via an appropriate machine display 80.

Figure 7:
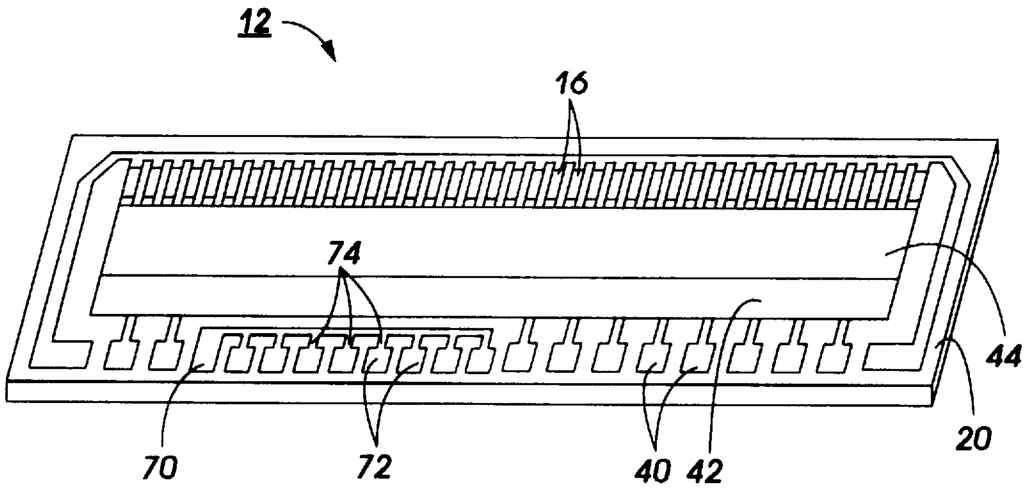
FIG. 7 is a top perspective view of a heater chip having encoded circuitry formed on its surface.

FIG. 7 shows the heater chip 12 shown in FIG. 3 modified by the addition of circuitry representing encoding circuit 60. Digital code circuit 61 includes a stimulus pad 70 which is connected to a plurality of data output pads 72. Each data output pad 72 is preferably connected to the stimulus pad 70 by a relatively thin lead 74. The plurality of output pads 72 corresponds to the plurality of binary digits forming a binary word having as many digits as output pads 72, 8 for this example. The controller 50 applies the ID code to the stimulus pad 70. A resulting voltage on the respective output pads 72 is read out as parallel binary data. This parallel data is processed by latch circuit 62 and shift register circuit 64. These circuits, as well as AND gate 66, 68 are formed on the surface of chip 12. However, the AND gates and latch and shift register circuits can also form part of the controller 50 circuits.

In the digital embodiment of the present invention, the chip 12 is originally manufactured with the stimulus pad 70 connected to all of the output pads 72, thus serving as the "template" which may be modified in light of such testing of the particular chip 50. In order to encode the output pads 72 with suitable digital data relating to the ID code for the chip, the binary data may be created by selectively disconnecting a preselected subset of the data output pad 72 from the stimulus pad 70 so that voltage read thereon will be read as 0, as opposed to the voltage ultimately from stimulus pad 70, which will appear on the pads 72 that remain connected. In order to disconnect the desired "0" digits, one simple technique is to simply cut the respective lead 74 by means of a laser, or alternatively, apply a relatively high voltage between a given output pad 72 and a point just opposite the corresponding lead 74, to "blowout" the relatively thin lead 74. When a voltage is applied to stimulus pad 70, the outputs of the output pad 72 will be read as a series of zeros and ones for interpretation of the control system of the printer.

A variation to the digital embodiment of the present invention shown in FIG. 6 is to create the stimulus pad 70, the output pads 72, and the intervening leads 74 out of a resistive ink which is simply printed on surface 20 as shown in FIG. 7. In the resistive ink embodiment, the desired data to be stored on the chip may be embodied in a printed pattern in the form of stimulus pad 70 and output pad 72, with the desired ones of the leads 74 absent from the printed pattern. The latch circuit 62, the shift register 64, and the AND gates 66, 68 are formed during the integral wafer fabrication process along with the rest of the transistors of the chip. These subcircuits can be located in the controller as well, although they are practically "free" when designed into the chip.

While the embodiment disclosed herein is preferred, it will be appreciated from this teaching that various alternative, modifications, variations or improvements therein may be made by those skilled in the art, which are intended to be encompassed by the following claims:

What is claimed is:

1. A thermal ink jet printing system comprising:

an ink jet printhead cartridge which includes a printhead substrate having a plurality of heater resistors formed thereon coupled to a driver circuitry, a digital code circuit including an n-bit digital identification code and controller means including a ROM containing an n-bit digital data signal representing a predetermined code, said controller means coupled to the driver circuitry and to the digital code circuit for sending said n-bit digital data signal to said digital code circuit, said digital code circuit generating a digital output signal sent to said driver circuitry indicative of whether said n-bit data signal matches the n-bit digital identification code, said controller means controlling a print operation of said printing system in response to said digital code circuit digital output signal.

2. The printing system of claim 1 wherein said digital code circuit is formed on said printhead substrate.

3. The printing system of claim 1 wherein said digital code circuit is formed as part of said controller means.

4. The printing system of claim 1 wherein said identification code represents a cartridge associated with a specific ink value.

5. The printing system of claim 1 wherein said identification code represents a specific energy level of signals applied to said driver circuitry and to said heater resistors by said controller means.

6. A method for controlling printer operation of a thermal ink jet printer in which ink is ejected from nozzles of an ink jet printhead onto a recording media, including the steps of:

sending an n-bit digital data signal representing a predetermined code to a digital code circuit which includes an n-bit digital identification code, generating a digital output signal from said circuit indicative of whether said n-bit digital data signal matches said digital identification code and controlling said printer operation in response to said circuit output.

7. The method of claim 6 wherein said digital code electrical circuit is formed on the printhead.

* * * * *